United States Patent [19]

Briggs, Jr. et al.

[11] Patent Number: 5,034,170
[45] Date of Patent: Jul. 23, 1991

[54] HIGH-PRECISION ADJUSTABLE INJECTION MOLDING OF SINGLE-MODE FIBER OPTIC CONNECTORS

[75] Inventors: Paul R. Briggs, Jr., Stillwater; Gabor D. Kiss, Long Valley; John P. Varachi, Jr., Wayne, all of N.J.

[73] Assignee: Bell Communications Research, Inc., Livingston, N.J.

[21] Appl. No.: 432,927

[22] Filed: Nov. 7, 1989

[51] Int. Cl.$^5$ .............................................. B29C 45/80
[52] U.S. Cl. ......................... 264/40.5; 264/1.5; 264/328.1; 264/328.7; 425/171; 425/577; 425/DIG. 5
[58] Field of Search .............. 264/1.5, 40.5, 328.1, 264/328.7; 425/171, 577, DIG. 5

[56] References Cited

U.S. PATENT DOCUMENTS

| | | | |
|---|---|---|---|
| 1,157,817 | 10/1915 | Steudner. | |
| 2,456,776 | 12/1948 | Faust | 279/6 |
| 2,703,032 | 3/1955 | Grove | 82/11 |
| 3,009,374 | 11/1961 | Foreman | 82/33 |
| 3,385,624 | 5/1968 | Baclini | 292/341.18 |
| 3,550,300 | 12/1970 | Roder | 42/1 |
| 3,956,965 | 5/1976 | Rusbach | 89/41 A |
| 4,531,702 | 7/1985 | Plummer | 264/1.5 |
| 4,911,518 | 3/1990 | Miller | 264/1.5 |

FOREIGN PATENT DOCUMENTS 1155282 10/1983 Canada ........................ 264/1.5

Primary Examiner—James Lowe
Attorney, Agent, or Firm—James W. Falk; Leonard Charles Suchyta

[57] ABSTRACT

An injection-molded connector for single-mode optical fibers includes two mating plugs having aligned fiber-receiving holes. To keep transmission losses in the connector at an acceptable level, the eccentricity of each hole relative to its plug profile must be maintained within a fraction of a micron. The mold utilized to form the plugs includes a dual-eccentric-cam adjustment mechanism that comprises nested conically shaped cams. In a method for fabricating such plugs, rotation of the cams serves to move a part of the mold that positions a hole-forming pin. By rotating this mechanism, the eccentricity of the fiber hole relative to the profile of the molded plug can be established and maintained within the required precision.

3 Claims, 5 Drawing Sheets

HIGH-PRECISION ADJUSTABLE INJECTION MOLDING OF SINGLE-MODE FIBER OPTIC CONNECTORS

BACKGROUND OF THE INVENTION

This invention relates to connectors and, more particularly, to high-precision molding of connectors for single-mode optical fibers.

Optical fibers are being increasingly used for a wide variety of purposes in the communication field. As the use of optical fibers increases, a significant need has arisen for low-cost connectors suitable for joining fiber ends together in a way that results in low transmission loss of the optical signal at the joint.

Several types of losses typically occur when the ends of optical fibers are connected together. Among these are losses which stem from angular misalignment between the fiber ends, from gaps between the fiber ends, and from axial misalignment (lack of concentricity) between the fibers.

A number of types of connectors are known for joining fiber ends together. One such type, commonly called a biconic connector, includes two substantially identical apertured plugs designed to respectively engage, in a mirror-image fashion, the two fiber ends to be joined. In the molding operation described herein, the axis of each plug aperture is intended to be positioned with a prescribed high precision with respect to the axis of the plug profile. When the fiber-containing plugs are brought into contact, the cores of the fibers are intended to be substantially concentric.

The cores of multi-mode optical fibers are large relative to those of single-mode fibers. Thus, establishing axial alignment between the cores of multi-mode fiber ends is far less difficult than it is with single-mode fibers. In practice, low-cost connectors for multi-mode optical fibers have been realized by high-volume forming of plastic parts in a conventional injection molding operation.

For single-mode fibers having, for example, a core diameter (mode field diameter) of only about 8.7-to-10 micrometers ($\mu$m), axial alignment of the fiber ends must typically be maintained below one $\mu$m to ensure that losses are kept at an acceptable level. The machining of suitable mold details to consistently achieve sufficient precision in a molded single-mode connector to ensure that such high-precision axial alignment is realized is a formidable task. This obstacle has priorly stood in the way of economically fabricating suitable single-mode connectors by conventional injection molding techniques.

Accordingly, considerable efforts have been made by workers skilled in the art aimed at trying to devise improved techniques for molding low-cost connectors suitable for joining single-mode fiber ends together in a low-loss way. It was recognized that these efforts, if successful, would contribute importantly to enhancing the quality and lowering the cost of communication systems that utilize single-mode optical fibers.

SUMMARY OF THE INVENTION

In accordance with the principles of the present invention, a mold for forming single-mode fiber optic connector parts includes an adjustment feature. In particular, a mold for forming an apertured connector plug includes an adjustment by means of which any measured eccentricity existing between the longitudinal axis of the plug aperture and the longitudinal axis of the plug profile can be reduced to and maintained within an acceptable tolerance. Adjustment of the eccentricity is carried out as part of the molding process and can be performed with the molding equipment idling at operating temperatures.

More specifically, a mold made in accordance with this invention includes two circular cams. An inner cam comprising a conically shaped front portion is mounted in a through opening formed in an outer cam. The front inner wall of the outer cam is conically shaped to be in contacting relationship with the front portion of the inner cam when the two cams are spring biased together.

The front face of the inner cam includes a hole. This front face comprises one wall of the mold cavity in which a hollowed-out apertured plug is formed in an injection molding operation. During molding, a mold core pin fits into the hole in the inner cam, which thereby determines the location of the pin as molding material flows around the pin to form the aperture in the plug. Rotation of either or both of the cams is effective to move the inner cam hole relative to the main longitudinal axis of the mold cavity. In that way, the position of the mold core pin is precisely determined.

In accordance with the invention, the axis of rotation of the outer cam is offset by a first distance from the main longitudinal axis of the mold cavity. Also, the axis of rotation of the inner cam is offset by a second distance from the axis of rotation of the outer cam. Futher, the longitudinal axis of the hole in the front face of the inner cam is offset by a third distance from the axis of rotation of the inner cam. To be able to rotate the cams to concentrically position the hole in the inner cam with respect to the longitudinal axis of the mold cavity, the sum of the second and third distances must be equal to or greater than the first distance.

BRIEF DESCRIPTION OF THE DRAWING

A complete understanding of the present invention and of the above and other features and advantages thereof may be gained from a consideration of the following detailed description presented hereinbelow in connection with the accompanying drawing, in which.

DETAILED DESCRIPTION

Figure 1:
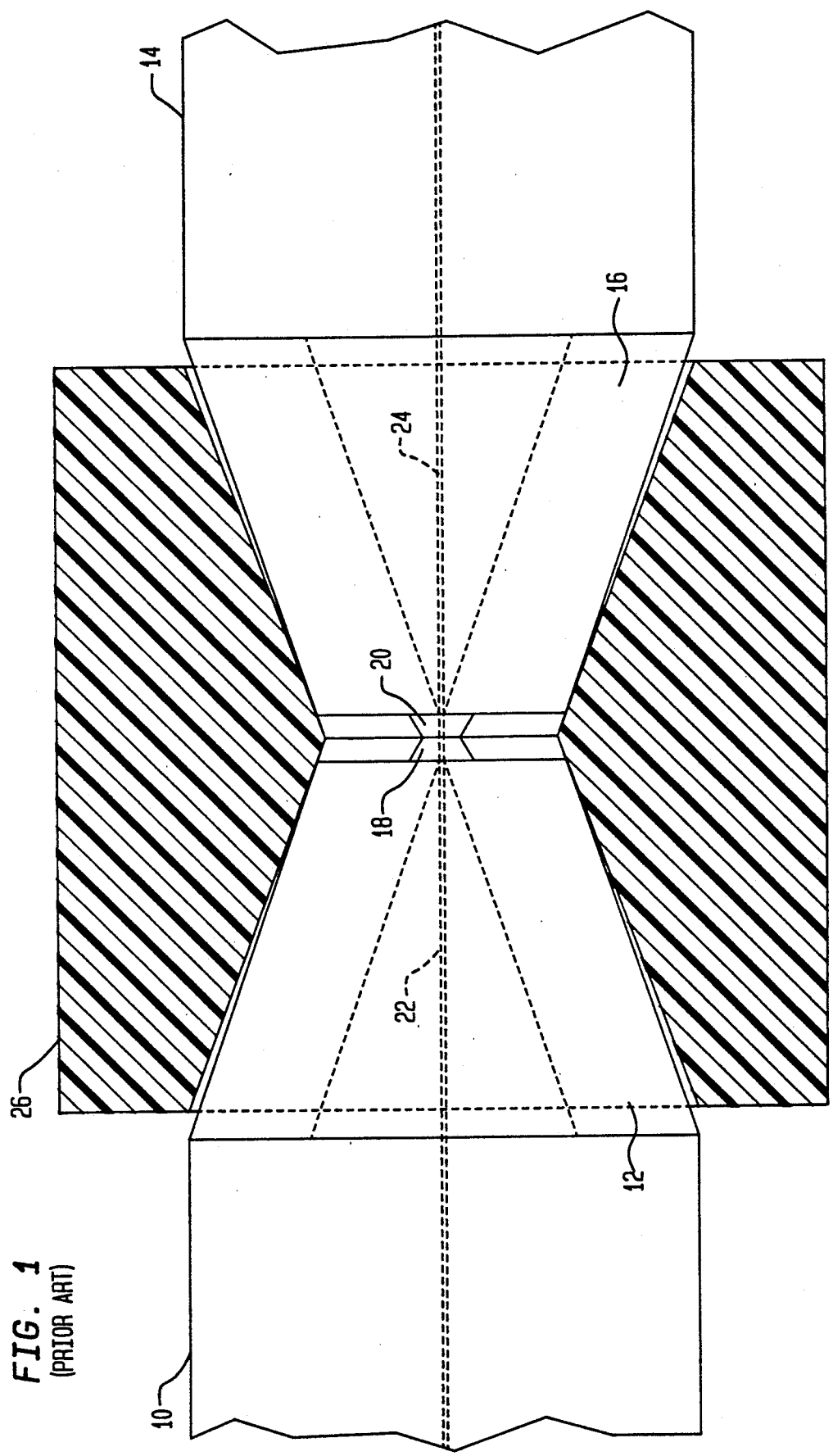
FIG. 1 is a side view, partially broken away, of a portion of a conventional biconic connector for optical fibers.

FIG. 1 shows a portion of a priorly known biconic connector designed to join together two optical fiber ends. The depicted connector includes two identical parts each including a cylindrical body portion and a hollowed-out conically shaped plug portion made, for example, of a suitable plastic material. Thus, one part of the connector includes body portion 10 and a plug 12 typically formed as a single integral unit. The other part includes body portion 14 and a plug 16 also formed as a single integral unit.

The plugs 12 and 16 depicted in FIG. 1 each include an apertured pedestal. The pedestals in the plugs 12 and 16 are respectively designated by reference numerals 18 and 20. The apertures in the pedestals 18 and 20 each have a diameter slightly larger than the outside diameter of an optical fiber end to be inserted therethrough. By way of example, the diameter of each of the apertures in the pedestals 18 and 20 is approximately 126-to-128 $\mu$m.

In FIG. 1, optical fibers 22 and 24 are shown butted together at the interface formed by the contacting pedestals 18 and 20. In practice, before butting the pedestals together as shown, the inserted fiber ends are glued into their respective apertures. After the glue has cured, excess fiber is scribed and removed. Then, the fiber end faces, any remaining glue and the pedestals end faces are simultaneously ground to provide the final correct geometry (not only flat end faces but also desired pedestal projection). This ensures that substantially no gap will exist between the fiber ends when the pedestals are butted together.

A standard sleeve 26 is shown in FIG. 1 surrounding the plugs 12 and 16 of the depicted connector. Additionally, as is well known, the connector includes other conventional parts (for example, springs, washers, housing) which are not shown in FIG. 1.

Heretofore, various expedients have been tried to ensure that the axis of the aperture in each of the pedestals 18 and 20 (FIG. 1) is approximately colinear with the axis of its respective plug profile. In one such typical, expedient, each apertured plug was machined after being molded to form a plug profile whose cross-section was approximately concentric with that of the aperture in the plug pedestal. Although tedious and expensive, such machining of the plugs after molding can serve to achieve a connector characterized by acceptably small axial misalignment of the fiber ends to be joined together.

In accordance with the principles of the present invention, the location of the longitudinal (horizontal) axis of the aperture in each of the pedestals 18 and 20 in FIG. 1 is controlled by an adjustment mechanism built into the molding apparatus itself. In that way, the longitudinal axis of the aperture is adjusted to be colinear with the main longitudinal axis of the plug profile with a high degree of precision. No secondary finishing operations on the molded plugs are necessary to achieve the desired degree of colinearity. As molded, plugs made in accordance with this invention are suitable for inclusion in the connector represented in FIG. 1 to achieve low-cost joining together of fiber ends in a low-loss manner. In particular, such plugs have been found to enable the cores of fiber ends to be consistently joined with a maximum eccentrically of less than one $\mu$m.

Figure 2:
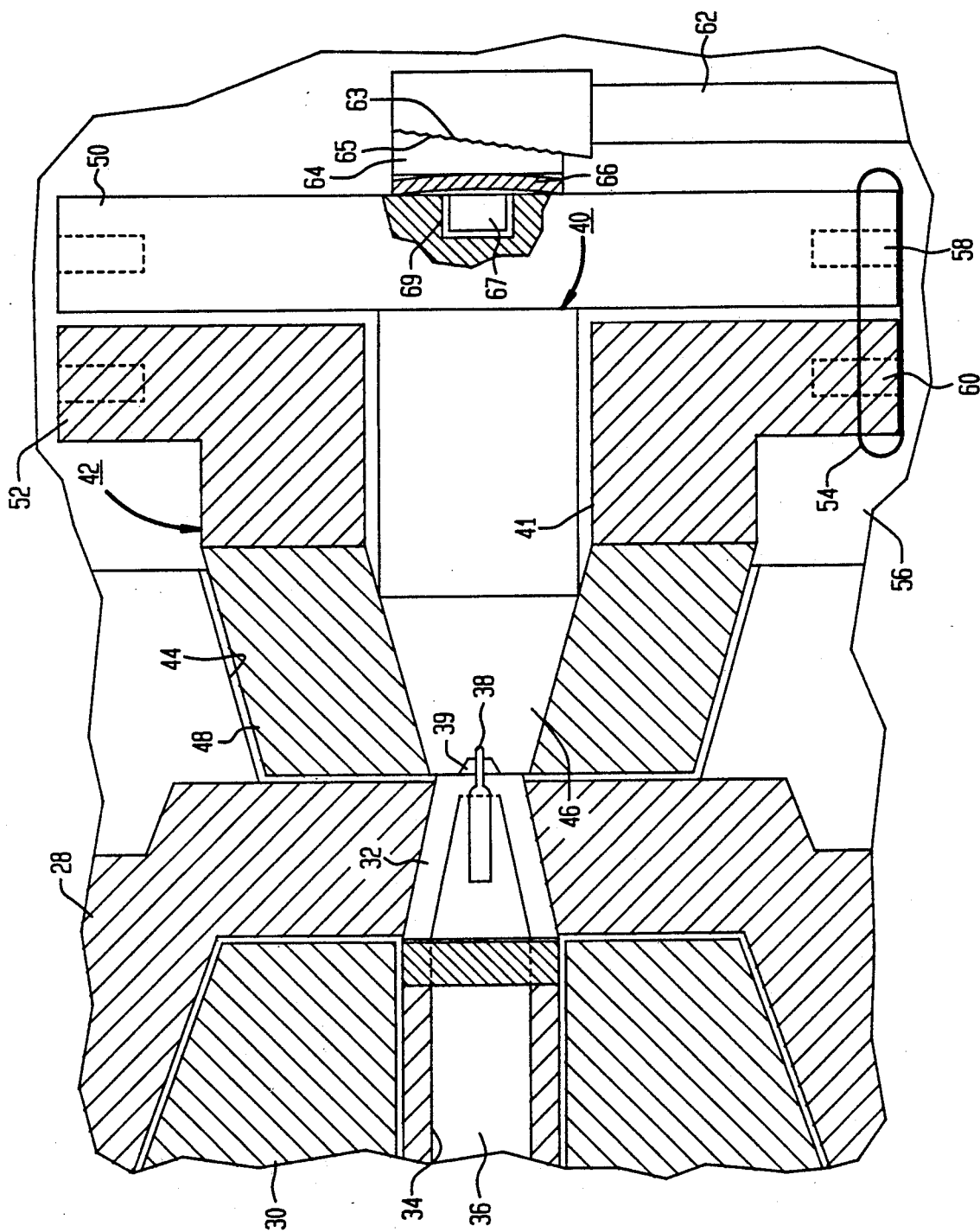
FIG. 2 is a simplified cross-sectional representation of a portion of an adjustable mold cavity made in accordance with the principles of the present invention.

FIG. 2 depicts a portion of a conventional injection molding apparatus as modified in accordance with the principles of the present invention. The molding apparatus includes one or more cavities in which plugs of the type shown in FIG. 1 are formed. Subsequently, each molded plug is attached in any standard way to its respective body portion. By way of example, the plugs are advantageously molded of a conventional thermoplastic material.

As indicated in FIG. 2, standard so-called A and B sides 28 and 30, respectively, of a conventional injection molding apparatus partially define a cavity within which a plug 32 is to be molded. The molding apparatus includes a standard ejector sleeve 34. Positioned within the ejector sleeve 34 is a core pin 36 having a conical front portion which extends into the cavity in which the plug 32 is to be formed. As a result of the core pin 36 extending into and along the full extent of the plug cavity, the molded plug formed therein has a conically shaped hollowed-out interior portion.

Fitted into the right-hand end of the core pin 36 is a multi-diameter stepped pin 38 whose smallest size determines the diameter of the hole to be formed in the pedestal of the molded plug. Illustratively, the pin 38 has a smallest diameter of 126-to-128 $\mu$m.

In a conventional molding apparatus as heretofore constructed, the right-hand wall of the mold cavity that defines the shape of the plug 32 shown in FIG. 2 would comprise a stationary plate. In turn, this plate would include a hole designed to receive the pin 38. In practice, however, such a fixed or non-adjustable mold cavity has been found to be incapable of consistently forming high-precision plugs suitable for use in connectors designed to join together the ends of single-mold fibers.

As a practical matter, machining of an economically feasible mold cavity of the type shown in FIG, 2 produces a cavity whose features are, for example, accurate only to about 0.0005 inches (0.5 mil) $\pm 0.1$ mil. With such a mold cavity, it is virtually impossible to ensure that the pedestal aperture of a plug formed therein will be concentric with the plug profile to a tolerance of less than one $\mu$m (0.000039 inches).

In accordance with the principles of the present invention, the right-hand wall of the mold cavity shown in FIG. 2 comprises the front (or left-hand) face of a rotatable cam 40 which is mounted within a well 41 formed in a rotatable outer cam 42. In turn, the outer cam 42 is mounted within a well 44 formed in the A side 28 of the molding apparatus.

The inner cam 40 (FIG. 2) comprises a front (left-hand) portion 46 that is conically shaped. The outer surface of the portion 46 is designed to intimately contact the inner surface of the front portion of the well 41 in the outer cam 42. This front portion of the well 41 is also therefore correspondingly conically shaped.

Similarly, the outer cam 42 comprises a front portion 48 whose outer surface is conically shaped. In turn, this front portion 48 is designed to intimately contact the surface of the well 44 which is conically shaped in a corresponding manner (and is an integral detail of the A-side cavity 28).

The cams 40 and 42 of FIG. 2 each include cylindrical flange portions 50 and 52, respectively. Further, each of the flange portions 50 and 52 includes a number of regularly spaced indentations formed in the peripheral surface thereof. Access to the indentations is obtained via window 54 formed in housing 56. As indicated in FIG. 2, two indentations 58 and 60 are accessible via the window 54.

By means of a simple tool (not shown) inserted through the window 54 into the indentations of FIG. 2, the cams 40 and 42 can be rotated to any desired angular position. To aid in the rotational adjustment, standard scale markings in appropriate increments such as one-half of a degree may be included on the apparatus.

In one specific illustrative embodiments of the invention, each of the flange portions 50 and 52 had a diameter of about 2.5 inches and each included 24 regularly spaced-apart circumferentially located adjustment indentations such as the ones designated 58 and 60 in FIG.

2. In practice, it is feasible to control the rotation of each of the inner and outer cams of such an embodiment to within about 0.25 degrees ±0.1 degrees.

A conventional illustrative mechanism is schematically shown in FIG. 2 for locking the cams 40 and 42 in place to prevent inadvertent rotation thereof. The depicted mechanism includes a movable arm 62 with an end finish containing an angled face 63, a multi-diameter pin 64 having a head with an angled face 65 which has the same relative angle as angled face 63 of the movable arm 62 but counter positioned so as to allow the two angled faces to be in intimate contact over their mating surfaces, and which also includes a smaller-diameter cylindrical extension 67 which is positioned in a cylindrical well 69 within the cylindrical flange portion 50 to maintain a coaxial relationship between the pin 64 and the inner cam 40, and a spring member 66 that comprises, for example, a cupped washer made of a spring steel.

Figure 3:
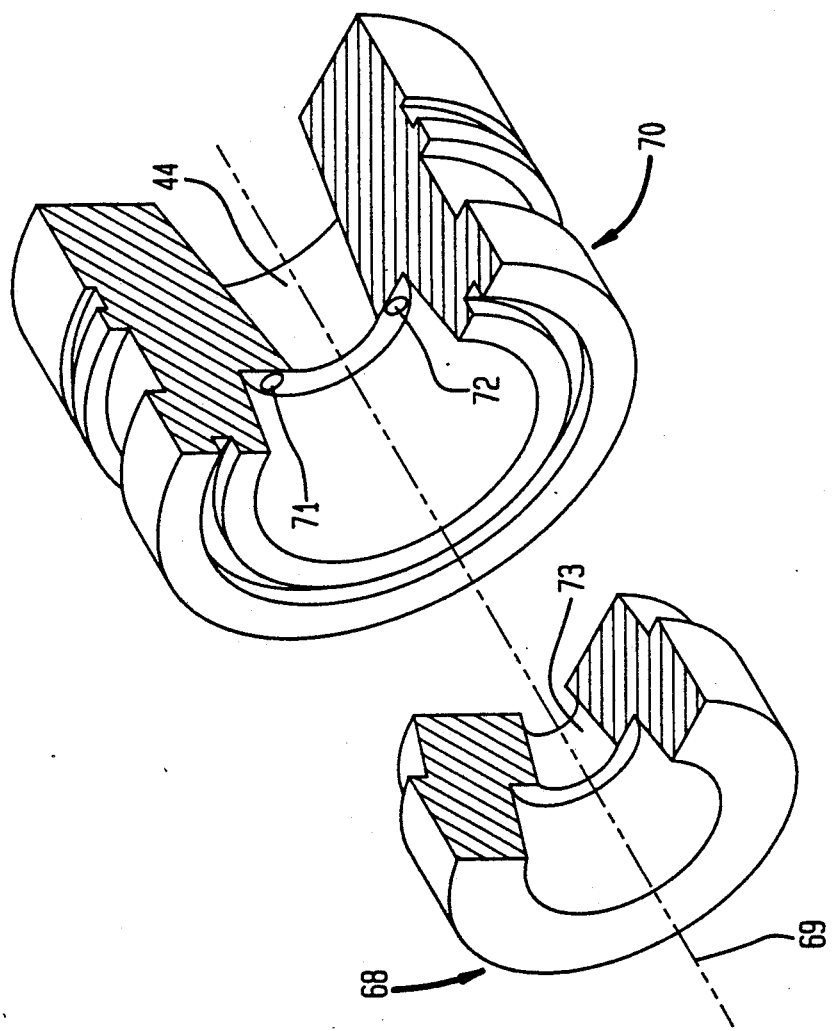
FIG. 3 is an isometric view showing more details of the mold cavity of FIG. 2.

FIG. 3 shows two parts 68 and 70 that when assembled together constitute the A side 28 of the mold cavity prepresented in FIG. 2. Longitudinal axis 69 defines the true central axis of the modl cavity. The parts 68 and 70 are secured together by, for example, screws (not shown) that pass through holes (only holes 71, 72 are shown) in the part 70 and into tapped receiving holes (not shown) in the part 68.

The part 68 of FIG. 3 constitutes the mold cavity block in which the plug 32 shown in FIG. 2 is formed. In particular, the conical outer surface of the molded plug 32 is defined by the walls of cavity 73 in the part 68.

The part 70 depicted in FIG. 3 includes the conically shaped well 44 shown in FIG. 2. As specified earlier above, the well 44 is designed to have the front conically shaped portion 48 of the outer cam 42 seated therein. Significantly, in accordance with the principles of the present invention, the longitudinal axis of the circularly symmetrical well 44 is purposely offset by a prescribed distance from the longitudinal axis 69 of the mold cavity. This feature of the apparatus will be specified in more detail later below in connection with the description of FIG. 5.

Figure 4:
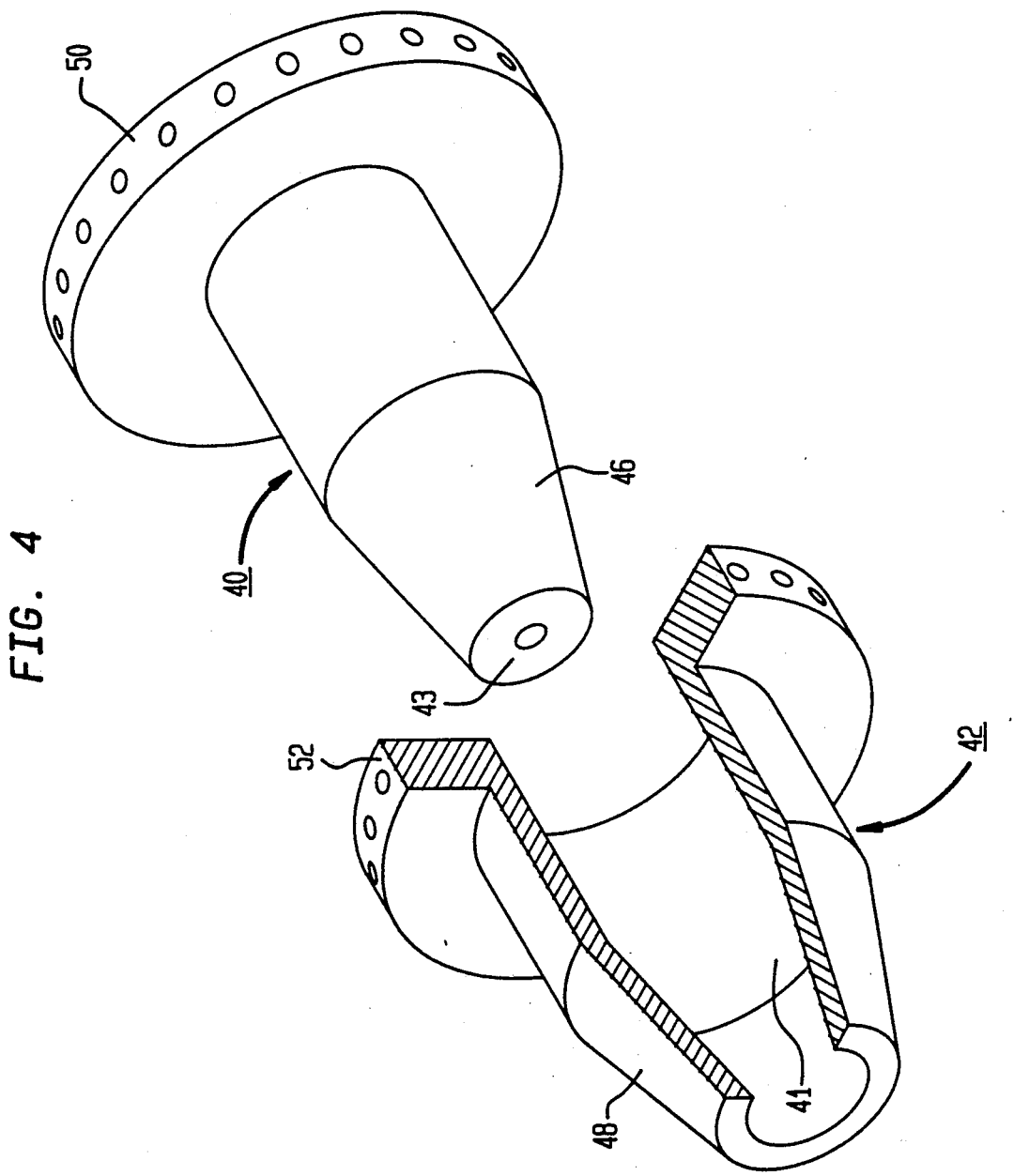
FIG. 4 is an isometric view of the two cams included in the adjustable mold cavity of FIG. 2.

FIG. 4 is an isometric view of the two cams 40 and 42 included in the adjustable mold cavity of FIG. 2. When the portion 46 of the inner cam 40 of FIG. 4 is seated in the well 41 formed in the outer cam 42, the front or left-hand face 43 of the inner cam 40 forms, in combination with the cavity 73 (FIG. 3), a partial enclosure into which plastic material can be injected to mold plugs for the herein-described connectors.

The front face 43 of the inner cam 40 includes an indentation into which plastic material flows to form the pedestal portion of the molded plug. This indentation is shown in FIG. 2 wherein it is designated by reference numeral 39. Centrally disposed within the indentation 39 is a hole formed in the front face 43 of the inner cam 40. As previously mentioned, this hole is designed to receive the smallest diameter of the pin 38 that constitutes an extension of the core pin 36 shown in FIG. 2. The location of this hole relative to the longitudinal axis of the mold cavity adjustable, as specified in detail below.

Figure 5:
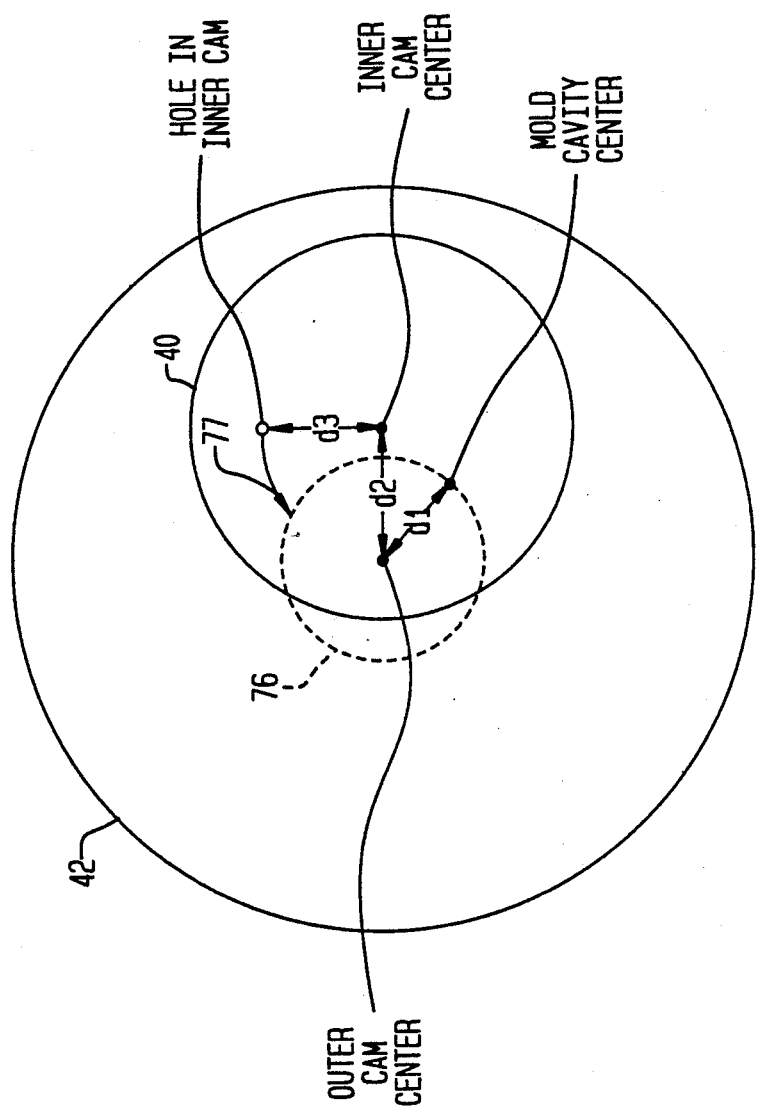
FIG. 5 is a schematic depiction of the offsets included in the dual-cam arrangement of the adjustable mold cavity.

As indicated earlier, the axis of rotation or center of the circular outer cam 42 is purposely offset from, but is in a fixed relationship as far as distance and direction to, the true center of the mold cavity. This relationship is schematically depicted in FIG. 5 wherein the distance d1 indicates the noted offset. Further, in accordance with this invention, the center of the well 41 formed in the outer cam 42 is purposely offset from the center of the outer cam. Thus, the axis of rotation or center of the circular inner cam 40 will also be offset from the center of the outer cam. In FIG. 5, this last-mentioned offset is indicated by the distance d2.

Additionally, the previously described hole formed in the front face of the inner cam 40 is purposely offset from the center of the inner cam. This offset is indicated in FIG. 5 by the distance d3. As a basis for always being able to move the hole (by selective rotation of the cams 40 and 42) to a position concentric with the center of the mold cavity, the sum of the distance d2 and d3 must be equal to or greater than the distance d1. Additionally, d1 must be greater than zero (i.e., the axis of rotation of the outer cam must be offset from the center of the mold cavity) to allow for manufacturing tolerances on d2 and d3.

In practice, molded plugs fabricated in an adjustable mold cavity made in accordance with the principles of this invention are measured by conventional techniques to ascertain the amount and direction of any eccentricity between the axis of the pedestal hole and the axis of the plug profile. If the measured eccentricity exceeds, for example, one $\mu m$, the mold cavity can be adjusted on-line, at operating temperatures, to move the hole in the inner cam to a location with respect to the center of the mold cavity that falls within the submicron. Straightforward calculations determine the exact amount of rotation of each of the cams to achieve the desired new hole location. Once so located, the hole in the inner cam forces the core pin to assume a corresponding location.

One specific illustrative procedure to follow to move the hole in the inner cam 40 towards the center of the mold cavity will now be described by reference to FIG. 5. Dash-line circular path 76 in FIG. 5 constitutes a reference circle whose radius is the distance d1. Counter-clockwise rotation of the inner cam 40 is effective to move the hole in the inner cam along a circular path 77 to intersect the circle 76. Then clockwise rotation of the entire dual-cam assembly as an intergal unit causes the hole in the inner cam to follow the path 76 to the point at which the center of the hole and the center of the mold cavity are coincident.

In practice, the aforedescribed adjustment procedure can, for example, be carried out as follows. First, the dual-cam assembly is enabled for rotation by releasing the locking mechanism that includes the movable arm 62 (FIG. 2). With tools inserted in the adjustment indentations in the inner and outer cams, the inner cam only is then rotated while holding the outer cam stationary. Subsequently, both cams are moved together jointly to rotate the hole in the inner cam to its desired location. (Alternatively, equivalent results can be obtained by rotating each cam independently from its existing to its final desired position). Within at the most several such successive adjustment cylces, an acceptable eccentrically dimension in the submicron range is consistently realized. And once realized, the adjustment can be locked in place and then maintained during molding, and even from day to day, over an extended period of time.

In one specific illustrative embodiment of the present invention, each of the offsets d1, d2 and d3 was established to be approximately 0.5 mil ±0.1 mil. Machining of molding apparatus with dimensions of this magnitude and precision is economically feasible. With such offsets and with cam structures of the type specified earlier above, submicron adjustability of an aperture or other feature is practicable. Such a specific embodiment is characterized by an asymmetrical polar adjustment range of from 0.5-to-1.5 mil.

In practice, the magnitude of the aforedescribed offsets is designed to be as small as economically achievable. This is so because as the magnitude of the offsets decreases, the smaller the change in distance between the feature being adjusted (for example, the receiving hole for the core pin) and the target (the axis of the cavity) per degree of rotation of the cams, thus yielding an appropriate increment for sub-micron adjustability. With offsets of the specific magnitude noted above, adequate fineness of movement of the hole in the inner cam can be realized without necessitating excessive precision in the adjustment of the rotation angles of the movable cams.

An important feature of the dual-cam adjustment structure described herein is that the conically shaped portions of the inner and outer cams fit together in an intimate contacting relationship with no play therebetween when the cams are spring-biased in their locked or non-rotatable position. Moreover, due to the circularly symmetrical nature of the assembly, the components expand and shrink together during temperature cycling without ever seizing. Adjustment of the mold cavity by means of the cams is thus possible at any time, even at elevated operating temperatures, once the locking mechanism is released.

Finally, it is to be understood that the above-described arrangements and techniques are only illustrative of the principles of the present invention. In accordance with these principles, numerous modifications and alternatives may be devised by those skilled in the art without departing from the spirit and scope of the invention. Thus, for example, while emphasis herein has been directed to the inner cam 40 including a hole that is intended to receive the pin 38 connected to the end of the core pin 36, it is apparent that variations of this arrangement are feasible. Illustratively, the structural feature included on the front face of the inner cam can be a protruding pin instead of a hole. In that case, the pin 38 is omitted and the core pin 36 is designed to include a hole at its end to receive the pin on the inner cam.

What is claimed is:

1. A method for fabricating connectors for optical fibers by means of an adjustable mold that includes off-center nested inner and outer cams whose outer surfaces are circularly symmetrical and have conically shaped mating portions, the axis of symmetry of said outer cam being offset from the main longitudinal axis of said mold, a face of said inner cam including a structural feature that is offset from the axis of symmetry of said inner cam, said face partially defining a cavity part into which moldable material is to be injected, said method comprising the steps of rotating said cams to move said structural feature to a position that is concentric with the main longitudinal axis of said mold, and injecting moldable material into the cavity part of said mold.

2. A method for molding connectors for optical fibers, each of said connectors including a longitudinally extending aperture therethrough having a longitudinal axis, and each of said connectors exhibiting a profile having a longitudinal axis, said method comprising the steps of providing a first mold part having a longitudinally extending mold cavity in which said connectors are molded, said first mold part including a longitudinally extending aperture-defining feature, providing a second mold part having nested outer and inner rotary members, said outer rotary member having its axis of rotation offset from the longitudinal axis of said mold cavity, said inner rotary member having its axis of rotation offset from said axis of rotation of said outer rotary member, said inner rotary member having a longitudinally extending feature positioned to mate with said aperture-defining feature of said first mold part, the longitudinal axis of said feature in said inner rotary member being offset from the axis of rotation of said inner rotary member, rotating at least one of said rotary members to align the longitudinal axis of said inner-rotary-member feature with the longitudinal axis of said mold cavity, thereby to reduce to within a prescribed tolerance any measured eccentricity between the longitudinal axis of the profile of a molded connector and the longitudinal axis of the aperture in said molded connector, and injecting moldable material into said mold cavity.

3. A method as in claim 2 further including measuring a just-molded connector while said mold parts are operating on-line to ascertain the amount and direction of any eccentricity between the longitudinal axis of the profile of said connector and the longitudinal axis of the aperture in said molded connector, and, if the measured eccentricity exceeds said prescribed tolerance, performing said rotating step before resuming molding.

* * * * *